Figure 1:
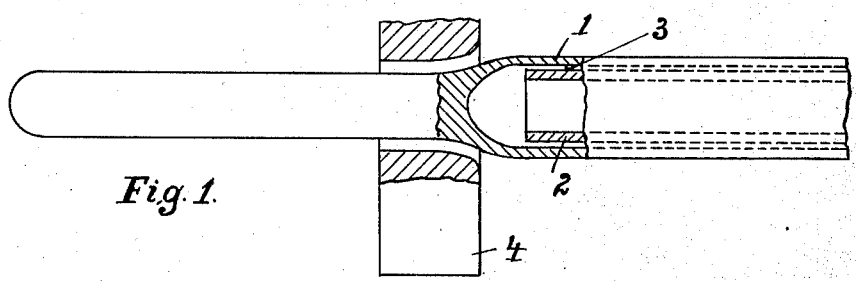

April 23, 1940.                H. BANGERT                2,198,149
PRODUCTION OF PIPE CONDUITS FOR CHEMICAL PURPOSES
Filed Aug. 3, 1937

Inventor:
Heinrich Bangert

Patented Apr. 23, 1940

2,198,149

UNITED STATES PATENT OFFICE 2,198,149

PRODUCTION OF PIPE CONDUITS FOR CHEMICAL PURPOSES

Heinrich Bangert, Dusseldorf, Germany

Application August 3, 1937, Serial No. 159,023

1 Claim. (Cl. 205—8)

This invention relates to improvements in or connected with the production of pipe conduits for chemical purposes and its object is to produce pipes from cheap base materials that are proof against the deteriorating action of acids without using expensive alloys in the production of said pipes.

The iron and metal industries have recently brought out various alloys from which vessels and particularly pipes of great strength and resistance to all kinds of liquids can be produced, which liquids normally have a deteriorating effect upon iron, or are altogether unsuitable to be brought in contact with iron. There are steels and alloys that are proof against the action of acids, lyes and other caustic liquids; others that may be brought in contact with fruit juices, beer mash, beer or similar liquids destined for human consumption without being affected by the action of said liquids or changing the condition or the taste of the latter. There are suitable alloys for practically all chemical requirements.

However, the employment of the particular alloys in the production of pipe conduits renders the manufacture rather expensive owing to the rather high price of said alloys, apart from the fact that in some countries the base materials, or some of them, are not available, so that the pipe manufacturers are more or less dependent on the supplies from foreign countries.

In order to reduce the manufacturing expenses of said acid resisting pipes for chemical purposes steps have been taken during recent times to utilize glass, porcelain and other ceramic stuffs, the base materials for which can be obtained at a much cheaper price. However, pipe conduits produced from such stuffs have no great strength and may only be utilized by observing special rules of safety.

The aim of the present invention is to remove these disadvantages by producing pipe conduits for acids, lyes and other caustic liquids, or also liquids destined for human consumption, from glass, porcelain or other ceramic stuffs suitable for the purpose, which said pipe conduits themselves are then drawn into tubes made of common iron or other cheap metal. To this end the tubes made of glass, porcelain or the like, according to the invention, are introduced into the iron or metal tubes with a certain allowance of play between them, whereafter both tubes thus assembled are drawn through a ring of somewhat smaller bore than the outer diameter of the iron or metal tube, whereby the latter is pressed against the introduced glass or porcelain tube so that both are firmly held together.

In the accompanying drawing various stages of the method are illustrated, by way of example, it shows—

Figure 2:
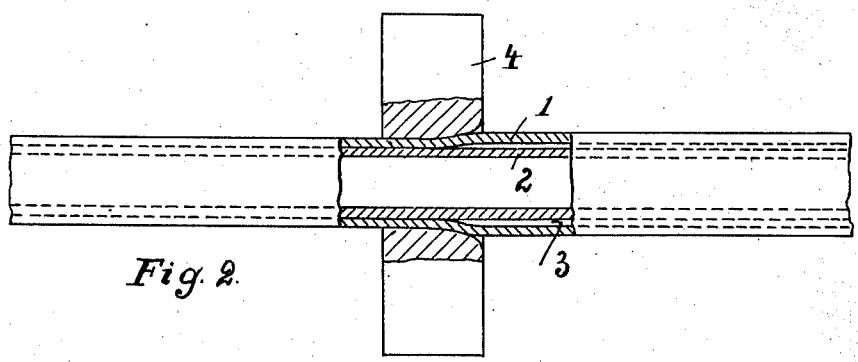
Figure 3:
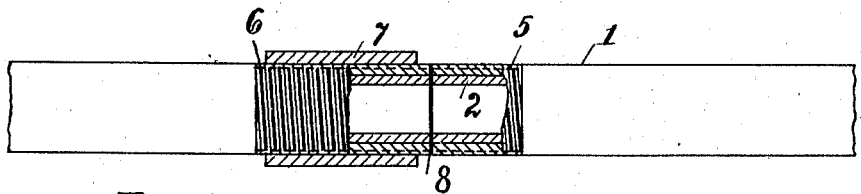
Figure 4:
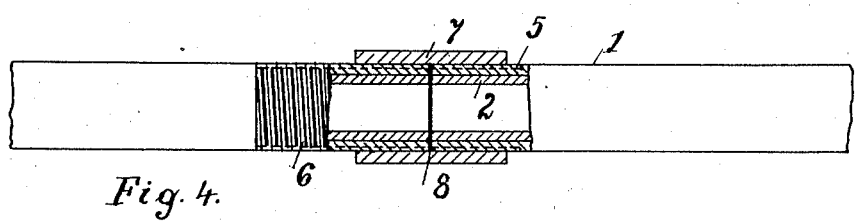

Fig. 1 a fractional view, partly in section, of the end portion of a metal tube with introduced ceramic tube, and the drawing ring, the drawing machinery being of the construction well known to those skilled in the art, having been omitted, Fig. 2 a fractional view, partly in section, of the tubes while the method is in progress, Fig. 3 a fractional view, partly in section, of the end portions of two tubes produced according to the improved method, ready for uniting and Fig. 4 a fractional view, partly in section, of the united end portions as shown in Fig. 3.

Referring to the drawing, 1 represents the outer tube, made of metal, iron or the like metallic substance and 2 the inner tube made of ceramic substance, the latter being introduced into the former with allowance for play, as indicated at 3. 4 indicates the drawing ring through which the assembled tubes 1 and 2 are drawn in known manner by any conventional type of drawing machinery.

Pipe conduits made according to the present invention are not only extremely cheap in production by reason of the cheapest materials used, but offer the same advantages as those produced from high grade alloys. The outer iron or metal shell 1 offers effective protection to the inner tube 2 and gives it all required strength. On heating tubes produced according to the invention till the inner tube assumes a plastic condition, as for instance in the case of glass being used, it will be understood that the entire tube may be bent and shaped for fitting up according to requirements. Also the connection of individual lengths of tubes to long conduits may be performed without difficulties. To this end, one end of the protective iron or metal shell is provided with a screw thread 6 of the length of the union piece 7, which latter is completely screwed over the said threaded end of the outer shell. Thereafter two lengths of tubes are placed in line, see Figs. 3 and 4, when the inner tubes 2, made of glass, porcelain or other ceramic stuff are united together by smelting, cementing or in any other convenient manner, see 8, Figs. 3 and 4, whereafter the union piece 7 is partly screwed back from the end of the one outer shell over the correspondingly threaded end of the opposing outer shell of the other tube, by which the final connection of the two tube lengths is accomplished.

I claim:

A method of constructing lined metal conduits for chemicals in such a manner that the conduits are lined throughout with glass on which the chemicals have no action and, there being no bond between the lining and the metal, although the metal gives full support to the lining, the conduits can be cut at any point intermediate their ends, and portions of the conduits can be joined by uniting the ends of the lining and then connecting the ends of the metal portions with a screw threaded sleeve engaging with screw threads formed directly in the metal portions, the method of construction being that a tube of the lining material is inserted loosely into a metal tube, the two tubes being then cold-drawn through dies which reduce the dimensions of the metal tube so that it presses upon the lining tube throughout the entire length of the tubes.

HEINRICH BANGERT.